United States Patent [19]

Smeitink

[11] Patent Number: 5,039,123

[45] Date of Patent: Aug. 13, 1991

[54] WHEEL TROLLEY

[75] Inventor: Jan Smeitink, Venray, Netherlands

[73] Assignee: Quickwheel Holdings, B.V., Rotterdam, Netherlands

[21] Appl. No.: 434,466

[22] Filed: Nov. 13, 1989

Related U.S. Application Data

[63] Continuation of Ser. No. 44,810, Apr. 30, 1987, abandoned.

[30] Foreign Application Priority Data

May 8, 1986 [NL] Netherlands ........................ 8601172

[51] Int. Cl.[5] ................................................ B62B 3/02

[52] U.S. Cl. ...................................... 280/641; 280/37; 280/79.4; 414/430; 414/537

[58] Field of Search ..................... 280/79.11, 79.4, 35, 280/639, 641, 47.131, 47.15, 11.23, 80.1, 62, 37; 414/430, 537, 426; 180/906

[56] References Cited

U.S. PATENT DOCUMENTS

| | | | |
|---|---|---|---|
| 2,254,564 | 9/1941 | Caslake | 414/430 |
| 2,358,864 | 9/1944 | Lockwood | 414/430 |
| 2,414,383 | 1/1947 | Merriam | 414/430 |
| 2,607,607 | 8/1952 | Day | 414/430 X |
| 3,583,723 | 6/1971 | Nowell | 280/79.1 A |
| 3,720,422 | 3/1973 | Nelson | 280/79.1 A X |
| 3,822,069 | 7/1974 | Hoff | 280/8 |
| 4,350,470 | 9/1982 | Murillo | 280/79.1 A X |
| 4,465,421 | 8/1984 | Murillo | 280/79.1 A X |

FOREIGN PATENT DOCUMENTS

| | | | |
|---|---|---|---|
| 250009 | 12/1987 | European Pat. Off. | 414/430 |
| 970719 | 1/1951 | France | 280/62 |
| 318228 | 12/1969 | Sweden | 280/35 |
| 30031 | 3/1904 | Switzerland . | |
| 669555 | 4/1952 | United Kingdom | 280/62 |
| 2178666A | 2/1987 | United Kingdom . | |

*Primary Examiner*—Charles A. Marmor
*Assistant Examiner*—Tamara L. Finlay
*Attorney, Agent, or Firm*—Kenyon & Kenyon

[57] ABSTRACT

A tolley for supporting a wheel of a vehicle so that the vehicle may be driven or moved without the wheel touching the ground. The trolley has a hinged frame equipped with three or more wheels, a drive-on part which tilts upward when a wheel is driven onto the trolley and which then supports the wheel from behind, and a front support member. The front support member may be locked in place after the wheel has come to rest on the trolley. The trolley may be folded for storage.

17 Claims, 4 Drawing Sheets

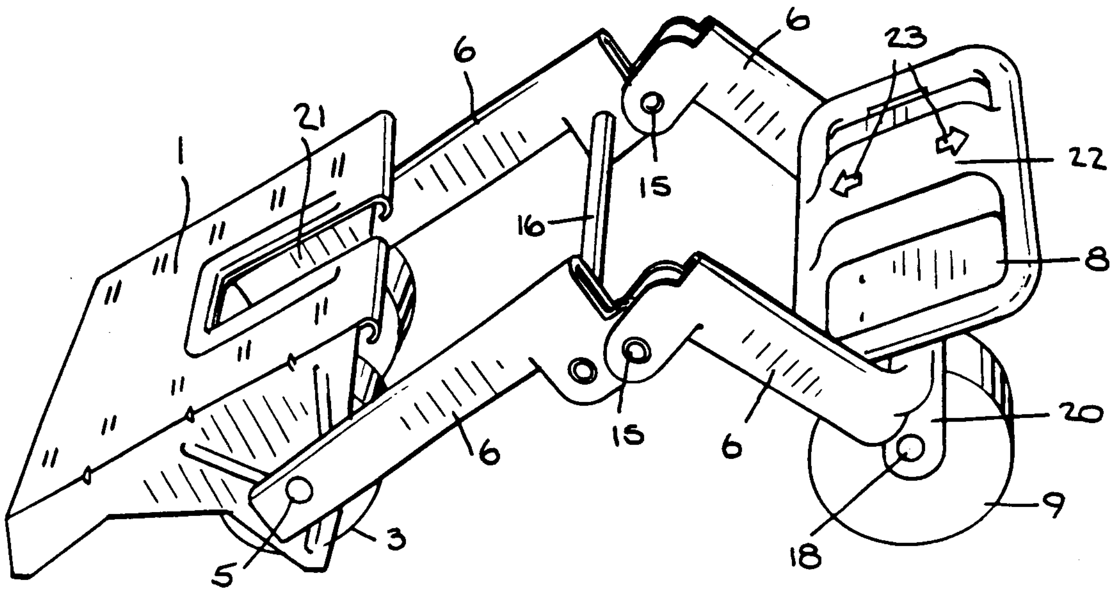
Fig. 4.
Fig. 5.
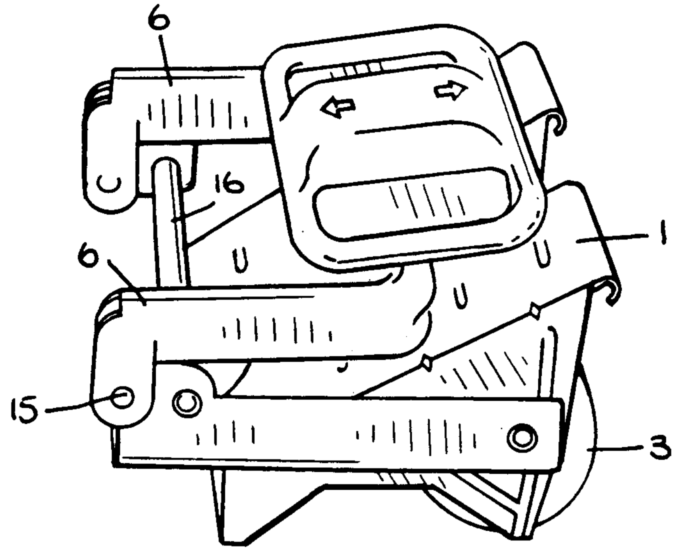

WHEEL TROLLEY

This application is a continuation of application Ser. No. 07/044,810, filed Apr. 30, 1987 abandoned.

The invention concerns a trolley for supporting a wheel of a vehicle so that the latter can be moved without touching the ground, consisting of a frame equipped with three or more wheels, equipped with a drive-on part which, under the influence of pressure exerted thereon at a certain distance from the beginning of the part, tilts around an axis which runs in a transverse direction with respect to the trolley, and which, when in a tilted position, supports a wheel which has been driven onto the trolley at the rear side thereof with its upper surface, and equipped with means for supporting the wheel at its front side.

Such a trolley is described in the English patent application No. 2,109,313. If a wheel of a vehicle, such as a car or a caravan, has become blocked, for example as a result of a flat tire, the trolley is used in order to drive the wheel concerned onto it, after which the vehicle whose wheel is now supported by the trolley is now mobile again.

The vehicle is driven onto the trolley with the wheel concerned via the drive-on part, after which the wheel is clamped fast: it is (see the said patent application) supported at the rear side by the tilted drive-on part and rests at the front end against a supporting part which is also tiltable, while the bottom side rests on the floor of a tray which hangs under the frame.

In order to ensure that the trolly remains in place when driving a wheel onto it the drive-on part is equipped on its underside with a protruding part which, in the non-tilted situation, lifts up the trolley, so that the rear wheels are free from the surface below.

This known trolley has some disadvantages, such as: if it bumps against something when in motion a wheel which is supported on it easily slips off. A further disadvantage is formed by the relatively large dimensions thereof, which often stand in the way of easily taking it along in, for example, the trunk of a car, without it taking up a lot of room.

The aim of the invention is a trolley of the type described above which does not have the disadvantages thereof.

For that purpose the trolley according to the invention is characterized in that a wheel which has been driven onto it is supported in two places, and this in such a way that at each place this is done by a part which is situated in front of or behind the wheel as the case may be which is mainly flat and which protrudes laterally, which parts are positioned with respect to one another in a wedge-shape, with the point of the wedge pointing towards the ground.

A wheel which has been driven onto the trolley is therefore only carried supported on its front and its rear side, and not on the bottom side as well. The wheel does not rest on a floor, but hangs, so to speak, between the two wedge shaped supporting parts which converge towards one another. This has as a result that due to the effect of gravity and the fact that the supporting parts are both flat, the supporting is effeced via wide supporting areas instead of narrow ones. As a result of the fact that in this way the area where a wheel can be supported can also be situated higher than with the known trolley, the chance that the wheel slips off when bumping with the front side is considerably smaller and the trolley is therefore safer.

A further advantage of the design according to the invention is that the wheel "draws" the trolley better. This is especially important when carrying steered (front) wheels of a car. As a result of the fact that the trolley is "drawn" better it is now especially possible to design it without relatively expensive swivelling wheels as front wheel or front wheels.

With a certain choice of the distance between the supporting parts and the angle between them it is possible to be able to support wheels which vary considerably in size. In order optimalize this it is possible with a design of the trolley according to the invention to make the distance between the supporting parts adjustable. If, for example, the tilting axis of the drive-on part coincides with the axles of the rear wheels, the side parts of the frame which protrude longitudinally are equipped with a series of supporting locations situated one behind the other, such as holes, for the wheel axles. By fixing the wheels, and in doing so the drive-on/supporting part, further to the front, the trolley becomes suitable for smaller wheels.

In order to ensure that the angle between the supporting parts is always the correct angle, it can be advantageous to make the front supporting part freely tiltable around an axis which runs in a transverse direction with respect to the trolley. In this way it is self adjustable. Under the influence of a wheel which is driven onto the trolley that part is then automatically tilted into the correct position.

After a particular tilt position has been reached it is important to ensure that the part is fixed in that position in order to keep the wheel supported and clamped optimally. For that purpose a mechanism is applied whereby the supporting part can be locked with respect to the frame. A simple and efficient way is to allow notches present in that part, for example holes, to work together with a protruding part which is present on the frame. This can be operated with the aid of, for example, a spring lip which is mounted on the frame.

Due to the fact that the trolley according to the invention has no floor on which the wheel which is to be supported rests, the disadvantage of the large dimensions of the known trolleys can be avoided by designing it in a folding version. This can be effected by designing the frame parts which run longitudinally from front to rear in a divided manner, and to equip them at the place where they are divided with hinges, hinging on a hinging axis which runs in a transverse direction with respect to the trolley, so that, for example, the front side of the trolley can be folded with its underside against the underside of the rear part.

In a preferred design of the trolley according to the invention the hinges in the frame parts are situated at such a distance from the axle(s) of the rear wheels that, when it is in a folded position, the front wheels or the front wheel as the case may be are situated behind the rear wheels and under the drive-on part. In this way a very compact, handy product is obtained, whereby the wheels are situated between the supporting parts.

In another preferred design according to the invention the trolley has three wheels, two rear co-axial wheels, each hung with its own axle in a fork, and one central front wheel, also hung with an axle in a fork, and is characterized in that the hinges in the frame part are located at such a distance from the axles of the rear wheels that in a folded-up position the front wheel is situated approximately between the two rear wheels, and in that the drive-on part is equipped with a groove which runs from the front edge thereof towards the rear end, which can allow the front wheel with the fork to pass through.

This trolley can be folded up: in doing so the rearmost frame part hinges both around the axles of the two rear wheels and around the hinge which is present approximately half way along in the frame parts. In doing so the front wheel is brought backwards, whereby it is moved together with the fork through the groove in the drive-on part until it is located between the two rear wheels. In this manner too a compact and handy product is obtained.

If the trolley is used for supporting wheels with gutter-shaped rims it is advantageous, according to a further design of the trolley according to the invention, if the supporting surface of the frontmost supporting part is equipped in the middle of its upper side with a raised part. If such a wheel has been driven onto the trolley movement thereof in a sideways direction is then prevented, as a result of the fact that the raised part which is situated in the gutter-shaped rim holds the wheel in place.

This raised part preferably runs over the entire length of the supporting surface, thus forming a handle which can be used when folding-up the trolley or making it operational again.

If the trolley is used for supporting wheels with flat tires it is advantageous if it is equipped under the frame, approximately in the middle between the supporting parts, with a rod which protrudes in a transverse direction and which joins up the frame parts on the opposite sides. This rod prevents such a wheel which has been driven on from dragging over the ground with its tire, or from coming too close to the ground. This rod must be mounted in such a way that the rim of the wheel which has been driven on does not also rest on it, as the above mentioned advantages of a trolley according to the invention are then lost. The rod also contributes to the stability of the trolley and can serve as a handle for carrying it.

It will be clear that, depending on the application of the trolley, it can be designed in various ways; for example with one rear wheel and two front wheels—i.e. reversed, or with more wheels, if this is desirable in connection with the weight which rests on it, such as in the case of aeroplanes.

By ensuring that the wheels do not protrude outside of the frame, but are mounted within it, the handiness thereof is increased.

The invention will be explained further with the aid of the drawing, which shows designs of a 3-wheeled trolley according to the invention, in which.

the situation before a wheel is driven on
after a wheel is driven on
and the situation in a folded position and FIG. 4 and FIG. 5, in perspective, show how a design of the trolley can be folded-up.

Figures 1, 2A:
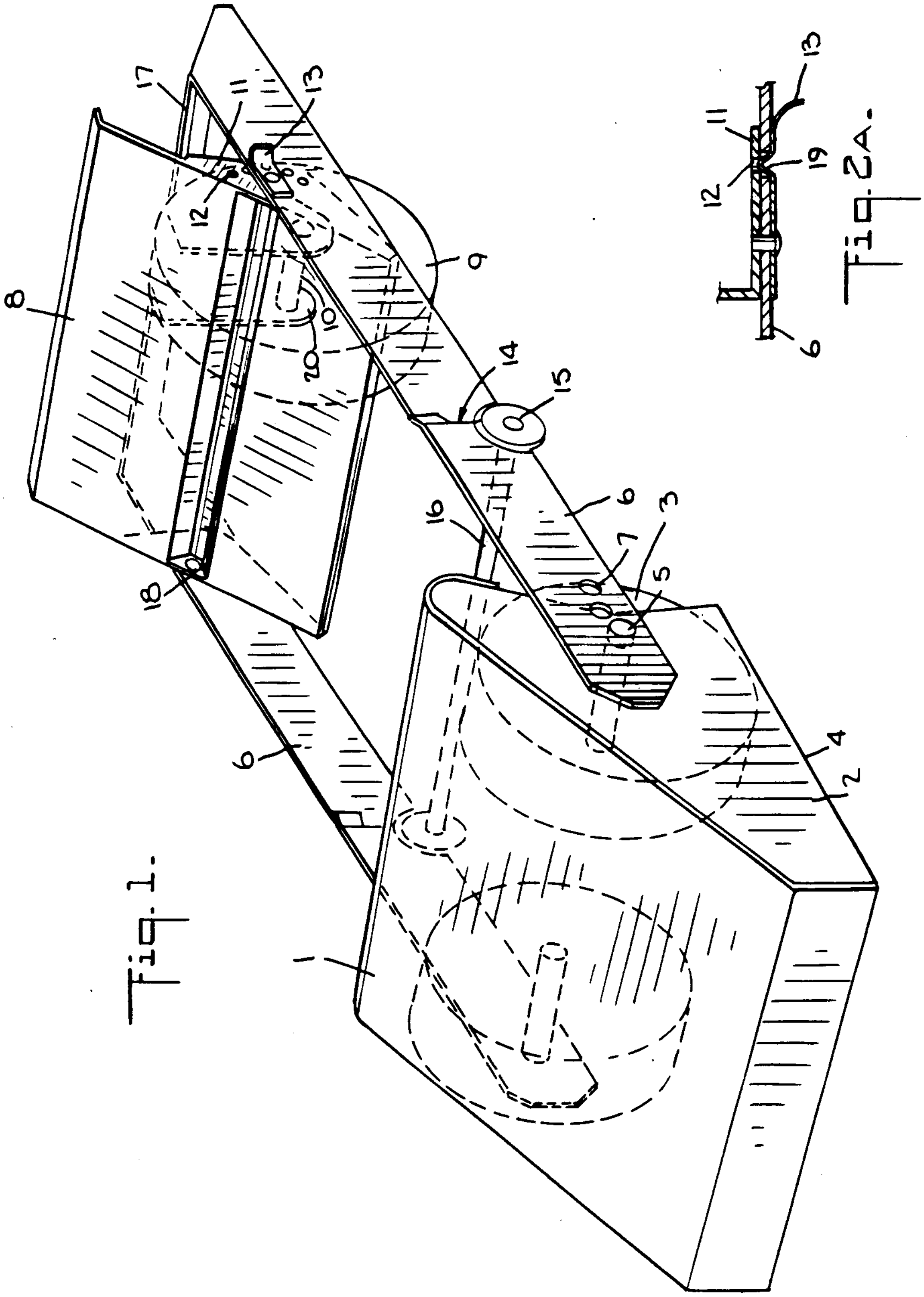
FIG. 1 shows the trolley in perspective and in a cutaway view.
FIG. 2A is a detailed view of the support member locking mechanism.

In FIG. 1, 1 is the drive-on part, which consists on its sides of parts 2, on which the trolley rests before a wheel is driven on: the rear wheels 3 are therefore then free from the ground and during the driving on the trolley is reasonably anchored via the edge 4 of the parts 2 to the underlying surface.

In the design which is drawn the rear wheels 3 all rest on their own axles 5, which are fixed to the frame parts 6. The holes 7 made in the frame parts 6 can also be used as fixing places for these axles 5.

The drive-on ramp 1 is tiltable around an axis which coincides with the axles 5 of the wheels 3. If a wheel is driven onto the running surface of the drive-on part 1 this latter part will, when the wheel has arrived above the tilting axis, begin to tilt and the wheel will then bump with its front side against the front supporting part 8 which is freely tiltable around its axle 18.

Figure 2:
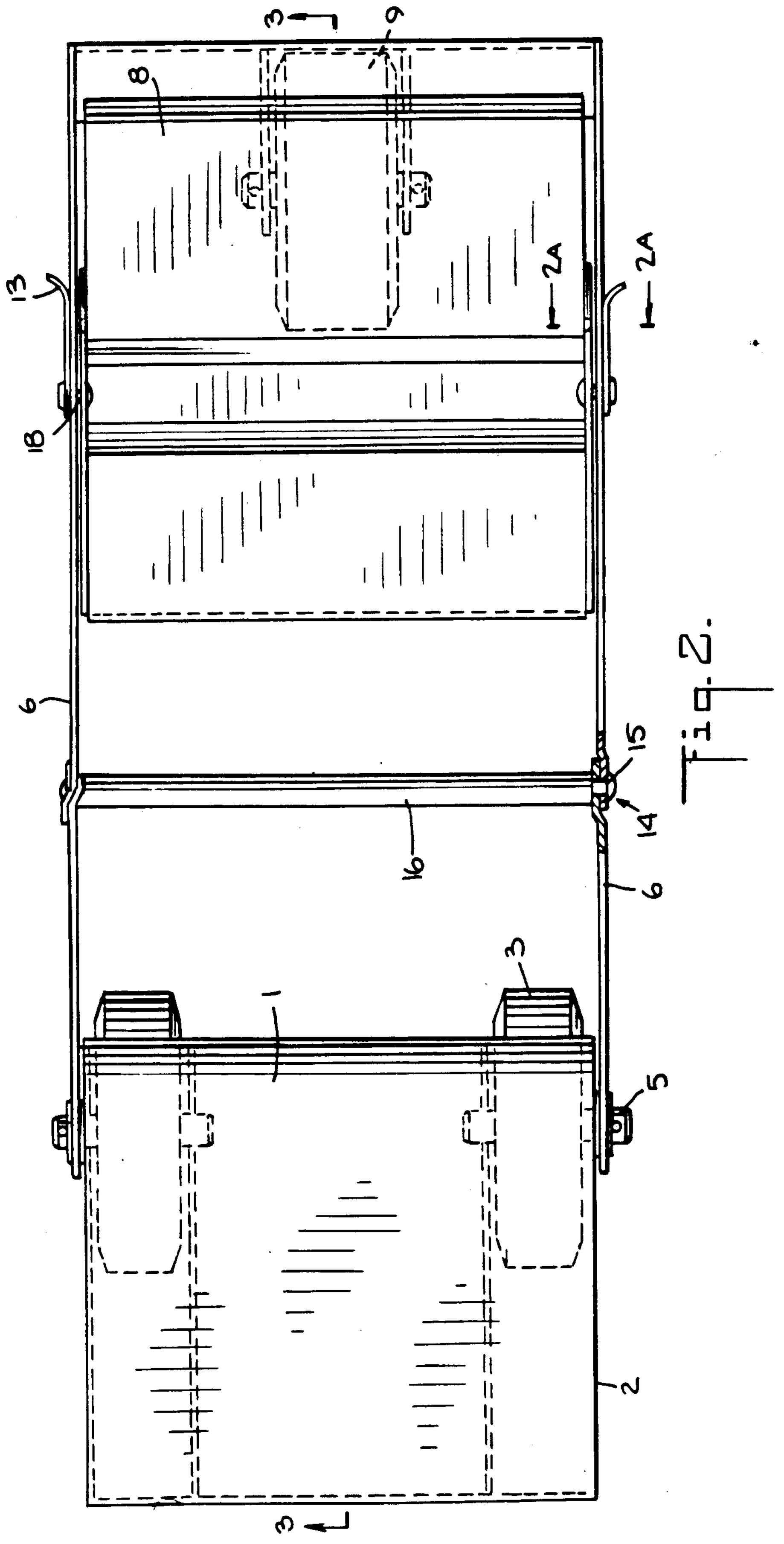
FIG. 2 shows a view of the trolley from above, in which the dotted lines indicate the parts which lie underneath.
Figure 3:
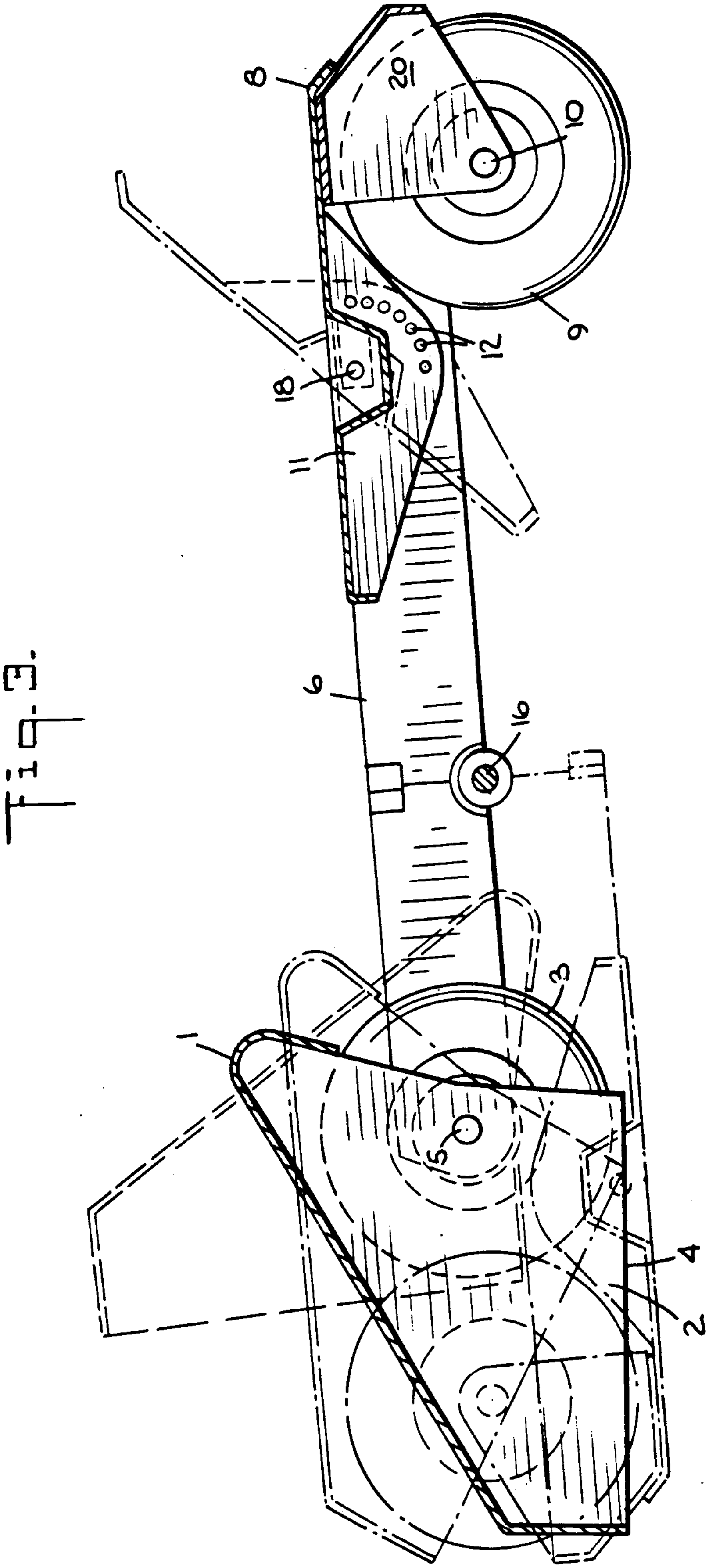
FIG. 3 shows a side view of the trolley in a cross-section whereby the following things are shown in one figure.

At the front end the trolley rests on the wheel 9, which is mounted on the axle 10, which is supported in the fork 20—see FIG. 2 and 3.

The supporting part 8 is equipped with side parts 11, in which notches 12 are situated, which work together with a protruding part which protrudes inwards from the frame part 6′—see 19 in FIG. 2A and which can be pressed into a notch 12 and 21 can be operated by the lip 13. In this way the part 8 can be locked in the position into which it is forced by the pressure of the wheel which has been driven onto it.

The frame parts 6 are divided into two parts at 14. At the place in which the frame parts 6 are divided—i.e. at 14—they are equipped on their undersides with hinges 15, hingeable around the axis 16.

17 shows a frame part which connects the frame parts 6.

It is apparent from the view from above in FIG. 2. how, when folding up the trolley via the hinging axis 16, the front wheel 9 ends up behind—and between—the rear wheels 3.

FIG. 3 first shows the situation as it is before a wheel drives on to the trolley: the drive-on part is situated in the position shown with 1 and the frontmost supporting part in the position shown with 8.

As a wheel is driven onto the trolley these parts 1 and 8 tilt; the tilted positions are shown in FIG. 3 by broken lines.

FIG. 4 and 5 show how a particular design of the trolley according to the invention can be folded up. This concerns a trolley whose drive-on part 1 is equipped with a groove 21. The frontmost supporting part 8 is equipped with a central raised part 22, which runs over the entire length of this part, and which can be used at 23 as a handle when folding it up. This folding-up takes place by grasping the frontmost supporting part 8, which can revolve around the axle 18, and "folding up" the frame parts 6 as shown, whereby these hinge around the axles 5 of the rear wheels 3 and the hinge 15, until the situation shown in FIG. 5 is reached. In doing so the front wheel 9 with its fork 20 is moved through the groove 21 until it is located between the two rear wheels 3. In order to turn the product into a handy package the supporting part 8 is revolved around its axle 28 until the position shown in FIG. 5.

I claim:

1. A trolley for supporting a vehicle wheel comprising:

a frame foldable about a hinge, said frame having a front, a rear, and two sides;

wheels rotatably attached to the front and rear of said frame for supporting the frame;

a first support member attached to said frame in such a manner that said first support member can pivot about a first axle;

means for locking said first support member in position;

a second support member comprising a drive-on ramp attached to said frame such that a vehicle wheel moving up said ramp and onto said trolley will cause said second support member to pivot about a second axle; and said first support member pivoting in response to the vehicle wheel coming into contact therewith such that the vehicle wheel is supported by said first and second support members.

2. A trolley according to claim 1 wherein the first support member has an upper surface, said surface having a center portion which is raised relative to the rest of said surface.

3. A trolley according to claim 1 further comprising a rod underneath said frame, located between said first support member and said second support member, said rod connecting one side of said frame to the other side.

4. A trolley according to claim 1 wherein said first and second axles are attached to said frame in a transverse direction.

5. A trolley according to claim 1 having three wheels.

6. A trolley according to claim 5 wherein one wheel is located at the front of said trolley and two wheels are located at the rear of said trolley.

7. A trolley according to claim 1 wherein said second support member further comprises a side part on which said trolley rests when said ramp is on the road surface, said side part extending far enough to hold said rear wheel or wheels of said trolley above the road surface as said second support member is rotating in response to a vehicle wheel being driven thereupon.

8. A trolley according to claim 1 wherein said wheels are mounted on wheel axles attached to said frame in a transverse direction.

9. A trolley according to claim 8 wherein one or more of said wheel axles are mounted on forks attached to the frame, each wheel axle so mounted supporting a single wheel and mounted on a single fork.

10. The trolley of claim 1 wherein said means for locking the first support member comprises:

said first support member having a side part comprising one or more notches; and said frame having a protruding part located so that it may be pressed into the notch to lock said first support member in position.

11. A trolley for supporting a vehicle wheel comprising:

a frame foldable about a hinge, said frame having a front, a rear, and two sides;

wheels rotatably attached to the front and rear of said frame;

a first support member, for holding the vehicle wheel supported by said trolley, said first support member attached to said frame in such a manner that said first support member can pivot about a first axle;

a second support member comprising a drive-on ramp attached to said frame such that a vehicle wheel moving up said ramp and onto said trolley will cause said second support member to pivot about a second axle; and said first support member pivoting in response to the vehicle wheel coming into contact therewith such that a vehicle wheel is supported by said first and second support members; and said drive-on ramp having a central groove running from said front edge toward said rear of the ramp.

12. A trolley for supporting a vehicle wheel comprising:

a frame foldable about a hinge, said frame having a front, a rear, and two sides;

wheels rotatably attached to the front and rear of said frame;

a first support member, for holding the vehicle wheel supported by said trolley, said first support member attached to said frame in such a manner that said first support member can pivot about a first axle;

said first support member having a side part comprising one or more notches;

said frame having a protruding part located so that it may be pressed into the notch to lock said first support member in place;

a second support member, for holding the vehicle wheel supported by said trolley, comprising a drive-on ramp attached to said frame such that a vehicle wheel moving up said ramp and onto said trolley will cause said second support member to pivot about a second axle; and said first support member pivoting in response to the vehicle wheel coming into contact therewith such that the vehicle wheel is supported by said first and second support members.

13. A trolley for supporting a wheel comprising:

a frame having a front part and a rear part, said parts having sides hingedly connected so that the frame may be folded for storage;

a front wheel connected to the front part of the frame by a fork and rotatable about an axle in said fork;

two rear wheels, one rotatable about a first axle mounted on said rear part of said frame and the other rotatable about a second axle mounted on said rear part of said frame, said first and second axles mounted on opposite sides of said rear part of said frame in a coaxial manner;

a first support member having at least one side part, said first support member attached to said front part of said frame by a transverse axle in a manner that allows said first support member to tilt, and said side part having notches therein;

a second support member attached to said first and second axles of said rear wheels in a manner that allows said second support member to rotate between a first position, in which said second support member rests on the road surface and serves as a drive-on ramp, and a second position, in which said second support member serves to support a wheel driven thereon, said second support member having a front edge, from which a central groove extends rearwardly, and at least one side part which extends so that in the first position said trolley rests on said side part and said rear wheels are held above the road surface; and a locking means for locking said first support member in place after a wheel has been driven onto the trolley.

14. A trolley according to claim 13 wherein said locking means comprises a protruding part of said frame, located next to said side part of said first support member, positioned to be pressed into said notches.

15. A trolley according to claim 13 wherein said front wheel and said groove are shaped and positioned such that when the trolley folds said front wheel passes through said groove and nests between said rear wheels.

16. A trolley for supporting a vehicle wheel comprising:

a frame having a front, a rear, and two sides;

wheels rotatably attached to the front and rear of said frame;

a first support member, for holding the vehicle wheel supported by said trolley, said first support member attached to said frame in such a manner that said first support member can pivot about a first axle;

means for locking said first support member in position;

a second support member, for holding the vehicle wheel supported by said trolley, comprising a drive-on ramp attached to said frame such that a vehicle wheel moving up said ramp and onto said trolley will cause said second support member to pivot about a second axle; and said first support member pivoting in response to the vehicle wheel coming into contact therewith such that the wheel is supporting by said first and second members.

17. The trolley of claim 16 wherein said means for locking the first support member comprises:

said first support member having a side part comprising one or more notches; and said frame having a protruding part located so that it may be pressed into the notch to lock said first support member in position.

* * * * *

UNITED STATES PATENT AND TRADEMARK OFFICE

CERTIFICATE OF CORRECTION

PATENT NO. : 5,039,123

DATED : August 13, 1991

INVENTOR(S) : Smeitink, Jan

It is certified that error appears in the above-identified patent and that said Letters Patent is hereby corrected as shown below:

Col. 1, ln. 64: the word "effeced" should read --effected--;

Col. 3, ln. 68: insert a --;-- between the words "position" and "and";

Col. 4, ln. 27: after "notch 12 and" insert --via a spring part 21, which--;

Col. 4, ln. 49: the word "FIG." should read --FIGS.--.

Signed and Sealed this

Twenty-seventh Day of April, 1993

*Attest:*

MICHAEL K. KIRK

*Attesting Officer*

*Acting Commissioner of Patents and Trademarks*